Jan. 7, 1969 V. A. STAYNER 3,419,919
HINGED BALL ROD AND A VALVE ASSEMBLY THEREOF INCLUDING THE SAME
Filed Aug. 4, 1966
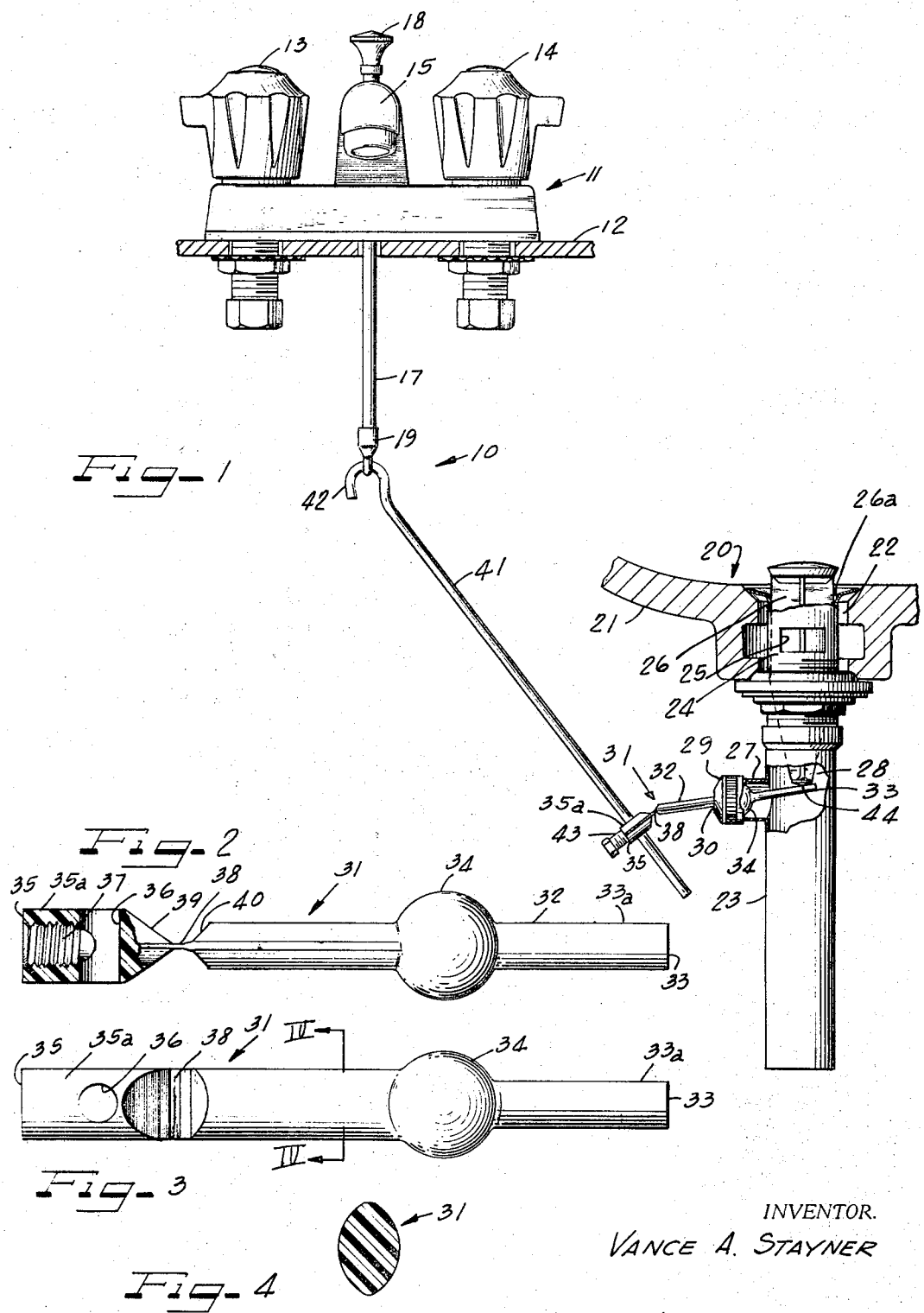
INVENTOR.
VANCE A. STAYNER
BY *Hill, Sherman, Meroni, Gross & Simpson* ATTORNEYS

United States Patent Office 3,419,919
Patented Jan. 7, 1969

3,419,919
HINGED BALL ROD AND A VALVE ASSEMBLY THEREOF INCLUDING THE SAME
Vance A. Stayner, Wauconda, Ill., assignor to Federal Huber Company, Chicago, Ill., a corporation of Illinois
Filed Aug. 4, 1966, Ser. No. 570,295
U.S. Cl. 4—203        6 Claims
Int. Cl. E03c 1/22

This invention relates to a hinged ball rod and a valve assembly including the same, and more particularly to a hinged ball rod formed integrally of a synthetic plastic for use in a pop-up type of valve assembly as a part of the actuating means for the valve.

In connection with lavatories it has been customary to use in combination with the faucet mounting a pop-up type of drain valve provided with actuating means extending through the faucet for manually operating the pop-up drain valve. As a part of the actuating means, a linkage has been used that provides a hinged connection and a ball-and-socket fulcrum for translating a downward-acting force applied manually to the actuating means into an upward-acting force for lifting the pop-up stopper type valve from its seat.

The present invention has for its object to replace the hinged ball rod now formed of metal and of a plurality of parts, by an integral hinged ball rod of a suitable synthetic plastic, such as polypropylene.

It is a further important object of this invention to provide a hinged ball rod of integral construction formed of a molded synthetic plastic, or resin, to replace the more expensive, multi-part metal ball rod heretofore used in a pop-up valve assembly for lavatories.

Other and further objects of this invention will become apparent from the following description taken in connection with the drawings, in which:

FIGURE 1 is an elevational view, partly in section, of the complete assembly in which the hinged ball rod of my invention is illustrated in association with the otherwise conventional components of such an assembly;

FIGURE 2 is a side elevational view, with parts broken away and in section, of the hinged ball rod of my invention;

FIGURE 3 is a top plan view of the ball rod shown in FIGURE 2; and

FIGURE 4 is a sectional view taken substantially along the line IV—IV of FIGURE 3.

As shown in the drawings the reference numeral 10 indicates generally the assembly illustrated in FIGURE 1, wherein there is shown a sub-assembly 11 mounted on a support 12 forming a horizontal planar upper rear portion of a lavatory wash basin, or the like. The sub-assembly 11 includes a pair of manually operable knobs 13 and 14 for controlling the flow of hot and cold water, respectively, through a common faucet 15 having fluid flow connections with the sources of hot and cold water (not shown). Additionally, there is illustrated a manually operable rod 17 extending vertically through the supporting wall 12 and the body of the faucet 15. The upper end of the rod 17 is provided with a knob 18 and the lower end with a connector 19. The rod 17, which may be termed a lift rod, serves the usual purpose of lowering a pop-up type of stopper when lifted and of raising the stopper from its seat when the rod is pushed downwardly. This is well understood by those skilled in this art.

In order to illustrate my invention and its mode of operation in actual use, FIGURE 1 includes a drain valve sub-assembly, indicated by the reference numeral 20, which for purposes of clarity is shown at an angle of 90° from its normal relationship to the vertical median plane of the sub-assembly 11. The drain valve sub-assembly comprises such conventional components as a lavatory bowl 21 in the bottom of which is provided a generally cylindrical opening 22 having a vertical axis; a drainpipe 23 dependent from said bowl and suitably connected therewith to receive the flow discharging through said opening 22; a drain plug 24 in the opening 22 and in fluid flow connection therewith and with said drainpipe 23 through wall openings 25; and an elongated fluted pop-up type of valve stopper 26 normally seated by gravity against a seal 26a around the upper peripheral edge of said drain plug 24.

Said drainpipe 23 is provided with a horizontally extending fitting 27 at a level approximately that of the lower end 28 of the pop-up valve stopper 26. The outer end of said fitting 27 has attached thereto a housing 29 providing a generally cylindrical ball socket having an opening 30 in its outwardly convex face through which extends one end of a ball rod, the inner portion of which continues axially through said fitting 27 to extend under and against the lower end 28 of the stopper 26.

In accordance with my present invention, the ball rod just referred to, here indicated generally by the reference numeral 31, is formed, preferably by a molding operation, of a suitable synthetic plastic, or resin, such as a polypropylene resin, as a unitary structure. Said ball rod 31, as best shown in FIGS. 2, 3 and 4, has an elongated rod-like portion 32, which is formed intermediate its ends with a segmental spherical portion 34 coaxial therewith. The rod-like portion 32, which is preferably of elliptical cross-section as shown in FIG. 4, is provided near its outer end 35 with a cylindrical portion 35a having a transverse bore 36 and an internally threaded axial bore 37 opening through said end 35 and into said transverse bore 36. Between said transverse bore 36 and said ball-like portion 34, and preferably somewhat adjacent the transverse bore 36, the rod-like portion 32 is symmetrically reduced in cross-section to provide a relatively thin, flat and narrow, hinge-like portion 38. The rod-like portion 32 is symmetrically notched on either side of the thin hinge-like portion 38 to provide outwardly divergent surfaces 39 and 40 sloping away from said hinge-like portion 38. That portion of the rod that includes the transverse bore 36, which is suitably of cylindrical form, has a diameter equal to the maximum diameter of the elliptical cross-section shown in FIG. 4.

By reference again to FIG. 1, it will be seen that a hook rod 41 is connected at its hook end 42 through an eye in the connector 19 to the lift rod 17. The other straight end of said hook rod 41 extends through the opening 36 of the ball rod 31, in which it is secured by a set screw 43 threaded into the bore 37 against said lift rod. With the ball rod 31 mounted as illustrated in FIG. 1, the outer portion 32 of said rod extends through the ball-and-socket joint housing 29, with the ball 34 free to swivel therein and with the inner end portion 33a of the rod in a position continguous to the lower end 28 of the stopper 26 so as to bring the adjacent portion of the ball rod into contact with the lower end 28 of said pop-up valve stopper, as at 44.

When the composite assembly 10 is in the position shown in FIG. 1, the stopper 26, or pop-up valve as it is sometimes called herein, is in its raised position for draining the lavatory bowl through the drain plug 24 and wall openings 25 into the drainpipe 23. At this stage of the operation, the lift rod 17 has been depressed as by downward manual pressure on the knob 18, thereby imparting a downward component of the force to the hook rod 41 along its length. By virtue of the downwardly acting component of force exerted by the hook rod 41, the thereto secured end 35a of the ball rod 31 is also displaced downwardly, thereby causing a flexing of the hinge-like portion 38. While of the desired degree of flexibility, said hinge-like portion 38 nevertheless offers sufficient resistance to flexing to apply a downward force to the adjacent outer portion 35a of the ball rod 32 and a resultant upward force to the inner end 33a of said rod, the inner extremity of which is indicated by the reference numeral 33, due to the swiveling or tilting action of the ball 34 within the housing 29. The ball 34 thus serves as a fulcrum for the rod portion 32. Said upward force lifts the stopper 26 to raise said stopper 26 off of its seat 26a and permit the contents of the lavatory to be drained.

When the lift rod 17 is raised, the outer rod end 35a is raised and the inner rod end 33a is lowered, allowing the stopper to reseat by gravity action against the sealing seat 26a. The lower end 28 of the stopper 26 normally remains in contact at 44 with the inner rod portion 33a during and after the gravity drop of the stopper 26.

While a polypropylene resin has been mentioned as the preferred material for the ball rod of my invention, other synthetic plastics and resins, such as the polyethylene and polyurethane resins, have comparable physical properties to make them suitable as substitutes for a polypropylene resin. These properties include a high degree of flexibility in thin sections yet of sufficient ruggedness to stand repeated flexings and sufficient resistance to flexing to transmit components of forces applied to one end of the ball rod to the other end of the ball rod through the thin section of the hinge-like portion.

It will be understood that modifications and variations may be effected without departing from the scope of the novel concepts of the present invention.

What I claim is:
1. A hinged ball rod comprising
   a unitary, synthetic plastic member of an elongated rod-like form having
   a segmental spherical ball thereon toward one end of said member and
   a transverse bore therethrough adjacent the other end of said member, and
   a reduced portion therein adjacent said bore providing a flexible hinge in said member.

2. A hinged ball rod as defined by claim 1, wherein said synthetic plastic is a polypropylene resin.

3. In combination with a valve assembly including a ball-receiving socket, a pop-up valve and actuating means for said valve,
   a hinged ball rod of a synthetic plastic having one end extending into contact with the lower end of said valve, having the other end connected to said actuating means and having a ball-like portion received in said socket, and
   a reduced portion providing a flexible hinge between said other end and said ball-like portion to permit said actuating means to apply an upwardly acting force as a fulcrum with said ball portion and socket through said one end against said lower end of said valve to raise the same.

4. In the combination defined by claim 3,
   a hinged ball rod of unitary construction formed of a polypropylene resin.

5. In a pop-up valve assembly including a pop-up valve, a ball-receiving socket, and means for actuating said valve including
   a hinged ball rod of integral construction formed of a synthetic plastic having a ball-like portion received in said socket and an intermediate reduced hinge-like portion providing for the angular flexing of said rod to translate a force applied to said actuating means into a valve lifting force.

6. The assembly as defined by claim 5, wherein said hinged ball rod is formed integrally of a polypropylene resin.

References Cited

UNITED STATES PATENTS

| | | | |
|---|---|---|---|
| 2,689,959 | 9/1954 | Holycross et al. | 4—203 |
| 2,807,806 | 10/1957 | Watkins | 4—203 |
| 3,353,192 | 11/1967 | Christiansen | 4—203 |

PATRICK D. LAWSON, *Primary Examiner.*